N. G. OLSON.
WATERING TROUGH.
APPLICATION FILED APR. 28, 1915.

1,158,831.

Patented Nov. 2, 1915.

Witnesses:

Inventor:
Nels G. Olson,
By Dyrenforth, Lee, Chritton and Wiles
Attys.

UNITED STATES PATENT OFFICE.

NELS G. OLSON, OF WYANET TOWNSHIP, BUREAU COUNTY, ILLINOIS.

WATERING-TROUGH.

1,158,831.  Specification of Letters Patent.  Patented Nov. 2, 1915.

Application filed April 28, 1915. Serial No. 24,530.

*To all whom it may concern:*

Be it known that I, NELS G. OLSON, a citizen of the United States, residing at Wyanet township, in the county of Bureau and State of Illinois, have invented a new and useful Improvement in Watering-Troughs, of which the following is a specification.

My invention relates to an improvement in the class of troughs for watering stock, and which I have devised for farm-use, more especially for watering hogs.

The primary object of my invention is to render the body of water in such a trough, automatically fed thereto as the supply is used, anti-freezing in cold weather. To this end I sink the body of the trough in the ground to a depth that will raise its top but slightly above the ground level and render it accessible for drinking, and feed the water by a pipe extending below the frost-line underground through the bottom of the trough into the latter wherein it is equipped with a float-controlled shut-off valve; and I provide the trough with a raised cover, forming an air space between it and the water-level, the cover being shorter than the trough and having a baffle depending at its shorter end into the trough below the water-level therein to leave a small opening between the baffle and trough-end of such dimensions as to comfortably admit the snout for drinking.

Figure 1:
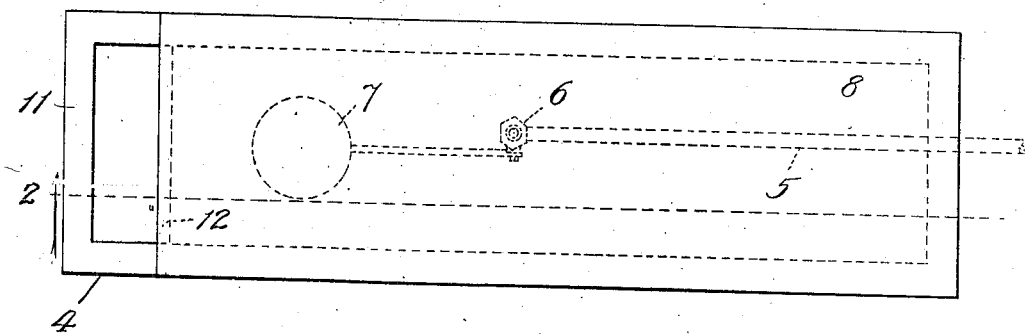
Figure 2:
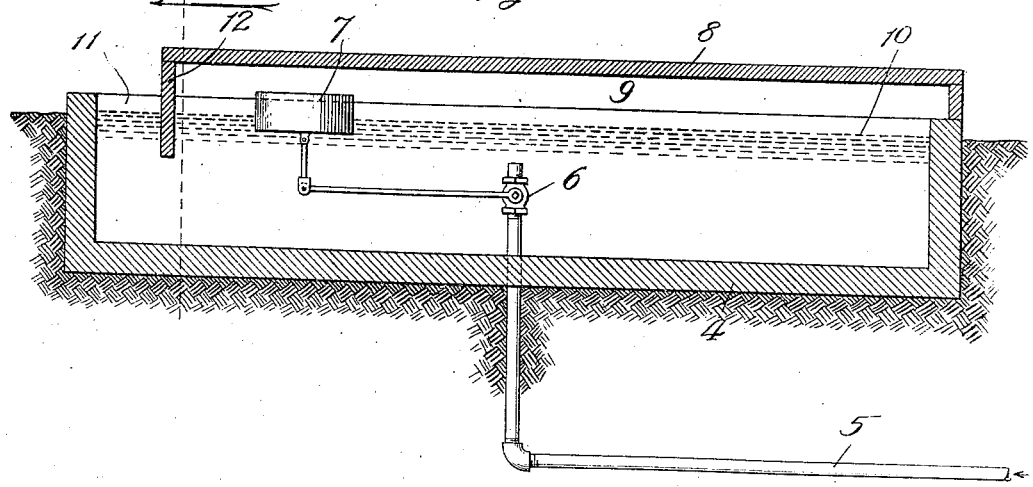
Figure 3:
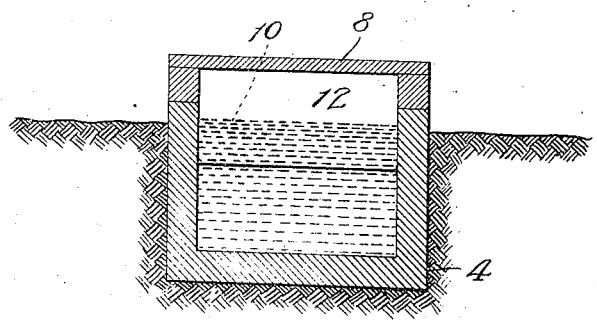

In the accompanying drawing, Figure 1 is a plan view of my improved watering trough; Fig. 2 is a section on line 2, Fig. 1, showing the trough in its operative, sunken condition equipped with automatic feeding means; and Fig. 3 is a section on line 3, Fig. 1.

The trough body 4 is shown of oblong rectangular shape, though it may be of other desired shape, and be made of wood, concrete, or any other suitable material. In use the trough is sunk in the ground, as represented in Figs. 2 and 3, and is fed with water from a suitable overhead or other automatic pressure supply (not shown), through a pipe 5, buried, as to its horizontal length to a depth underground to which frost is not likely to penetrate and rising into the trough through its bottom. The pipe is provided at its upper end in the trough with a suitable valve 6 controlled by a float 7. A raised cover 8 seats on top of the walls of the trough body and forms an ample air space 9 between it and the normal water-level in the trough at 10. The cover is shorter in length than the body 4 to form an opening at one end of the latter, and a baffle 12 depends from that end of the cover into the trough some distance below the water-level therein. The drinking space 11 thus provided, between the baffle and adjacent end of the trough, is sufficiently large to permit the animals to have easy access to the water; and as the water is withdrawn by their drinking, the supply is automatically replenished by the resultant sinking of the float to open the valve 6, which is again closed with the rise of the water-level in returning the float to its normal valve-closing position. This drinking space, however, is of such dimensions as to expose to the weather only a small surface-area of the body of water in the trough; but if the water at that point were to freeze to any great depth, or to a depth sufficient to prevent the animals from getting water, the apparatus would, obviously, be practically ineffective in its purpose. However, the water-supply through the buried pipe 5, and the air confined in the space 9, exert an attemperating effect on the body of water in the trough sufficient to prevent freezing, or any way deep freezing, of the water exposed at the drinking opening, and to prevent the freezing influence from extending thence into the body of water in the trough. In fact, in the use of my trough, insulated as described, during the winter, exposed to a temperature of 20° F. below zero, a mere film of ice formed over the water-surface at the opening 11; and at 28° F. below zero the ice formed there to a thickness of only about one-fourth of an inch and was readily broken by the hogs in gaining access to the water.

While my improvement is primarily intended to prevent freezing of the body of water in the trough in cold weather, it obviously, but with less purpose, prevents the water from becoming unduly warm in the summer, because of the small area exposed at the drinking opening, and the attemperating influence of the supply through the pipe 5 supplemented by the confined air in the space 9.

I am aware that it is not new with me to provide a watering trough having a cover forming or containing a drinking opening and provided with a depending wall or partition dividing the trough into compartments intercommunicating through openings in such wall or partition; but such troughs are not designed to be and are not, in fact, anti-freezing.

What I claim as new and desire to secure by Letters Patent is:

A watering-trough of the character described, comprising a water-holding body adapted to be sunk in the ground for a greater portion of its height, a supply pipe embedded in the ground a substantial distance below the bottom of the body of said trough and extending therethrough into the body, a float-operated valve in that portion of the pipe which extends within the body, a cover mounted on the body and spaced a substantial distance from the water level therein to form a dead-air space and terminating short of the front end of said body to afford an opening of restricted area, and a downwardly-extending baffle adjacent to said opening, for the purposes set forth.

NELS G. OLSON.

In presence of —
  E. B. STEVENS,
  WILLIS HAMRICK.